United States Patent [19]

DiAngelo et al.

[11] Patent Number: 5,613,164
[45] Date of Patent: Mar. 18, 1997

[54] PORTABLE SYSTEM HAVING DATA DISTRIBUTION AND POWER DISTRIBUTION REMOVABLY POSITIONED WITHIN PORTABLE ENCLOSURE DURING SHIPPING AND ADAPTED FOR REPOSITIONING WITHIN INTERNAL STORAGE SPACE DURING OPERATION

[75] Inventors: Michael F. DiAngelo, Boca Raton, Fla.; Gerald F. O'Neil, Endwell, N.Y.

[73] Assignee: International Business Machines Corporation, Armonk, N.Y.

[21] Appl. No.: 408,368

[22] Filed: Mar. 22, 1995

[51] Int. Cl.⁶ .................................................. G06F 15/00
[52] U.S. Cl. ..................... 395/884; 395/500; 395/800; 395/892; 361/603; 361/625; 361/657; 361/683; 312/201; 312/236
[58] Field of Search ........................... 307/147; 312/201, 312/236; 340/635, 825.5; 361/683, 644, 647, 775, 603, 625, 657; 364/550; 395/500, 800, 884, 892

[56] References Cited

U.S. PATENT DOCUMENTS

| | | | |
|---|---|---|---|
| 3,771,132 | 11/1973 | Biewer | 395/881 |
| 4,318,156 | 3/1982 | Gallagher | 361/647 |
| 4,361,832 | 11/1982 | Cole | 340/505 |
| 4,369,361 | 1/1983 | Swartz et al. | 235/470 |
| 4,709,971 | 12/1987 | Leeds et al. | 312/201 |
| 4,728,160 | 3/1988 | Mondor et al. | 312/236 |
| 4,780,714 | 10/1988 | Moustakas et al. | 340/825.5 |
| 5,065,141 | 11/1991 | Whitsitt | 340/635 |
| 5,070,429 | 12/1991 | Skirpan | 361/644 |
| 5,089,937 | 2/1992 | Carrubba et al. | 307/147 |
| 5,113,500 | 5/1992 | Talbott et al. | 395/309 |
| 5,216,579 | 6/1993 | Basara et al. | 361/683 |
| 5,230,074 | 7/1993 | Canova, Jr. | 395/750 |
| 5,301,303 | 4/1994 | Abraham et al. | 395/500 |
| 5,301,346 | 4/1994 | Notarianni et al. | 364/550 |
| 5,390,081 | 2/1995 | St. Pierre | 361/775 |
| 5,428,806 | 6/1995 | Pocrass | 395/800 |

FOREIGN PATENT DOCUMENTS 0349523  3/1991  Japan .

OTHER PUBLICATIONS

IBM Technical Disclosure Bulletin vol. 22, No. 8B, Jan. 1980, "Power System/Operating System Communications", by Coffin et al.
IBM TDB vol. 33, No. 4, Sep. 1990, "Technique For Monitoring A Computer System's Activity For The Purpose Of Power Management Of A DOS-Compatible System", by Ballou et al.
IBM TDB vol. 34, No. 10B, Mar. 1992, "Wearable Interconnection For Portable Computers", by Harrison.

Primary Examiner—Thomas C. Lee
Assistant Examiner—Po C. Huang
Attorney, Agent, or Firm—Eugene I. Shkurko; Lawrence R. Fraley

[57] ABSTRACT

All power supplies and LAN adapters required for multiple computer terminals in a networked environment packaged within one portable enclosure that functions as a shipping case. The enclosure is used as an overhead projector table and a printer stand.

8 Claims, 2 Drawing Sheets

PORTABLE SYSTEM HAVING DATA DISTRIBUTION AND POWER DISTRIBUTION REMOVABLY POSITIONED WITHIN PORTABLE ENCLOSURE DURING SHIPPING AND ADAPTED FOR REPOSITIONING WITHIN INTERNAL STORAGE SPACE DURING OPERATION

FIELD OF THE INVENTION

This invention relates to a portable computer network setup apparatus for quickly establishing a computing center with networked multiple terminals. In particular, this invention provides data and power distribution components for multiple computer system terminals, thereby providing fast, efficient, and error-free network setup and take down together with neat, safe, and unobtrusive cabling.

BACKGROUND OF THE INVENTION

Computer supported cooperative work meeting facilitation is a relatively new and effective way of conducting group meetings. Computer hardware, special software, a trained professional facilitator, and a physical location to hold a meeting combine to form a decision support center (DSC). Several of these exist throughout the world. The earliest were stationary decision support centers using desktop computers in a specially designed and dedicated meeting room.

Decision support center technology proves to be effective and efficient when compared to traditional meetings. However, DSC attendees need to travel to an existing center to participate. Travel is costly and time consuming. Portable decision centers reduce travel time for participants. Instead of moving people to the meeting, the meeting is moved to the people. Portable DSCs may utilize laptop computers and other portable components. Attempts have been undertaken at conducting DSC sessions at remote locations, but show the need for improvement. For example, setup time is excessive.

Computer system devices requiring low voltage power are made with external transformers, each transformer has an input connected to a power source and a low voltage output connected to the device. Data connections among components require various length data cables. Low voltage power is needed for computers, as battery life is limited. LAN adapter cards do not use batteries and require transformers. As an example, for a network environment using 19 laptop computers, such as in a DSC, 38 transformers need to be powered and attached to the computers and LAN adapter cards. Several extension cords and multiple outlet boxes are required. Multi access units (MAUs) are scattered along the floor to allow for wiring the LAN with fixed length cables. This type of setup is time consuming, unsightly, difficult to trouble shoot and awkward.

Laptop computers were designed to run from individual power adapters as are the LAN adapters. When arranged as a decision support center, 6–18 computer-with-LAN adapter combinations are used each requiring two individual power transformers. Also, dozens of power outlets are required to supply the transformers. The multi access units are left loose on the floor or conference table. This arrangement is unwieldy to set up and provides several opportunities for error.

Wireless LANs and the use of multiple batteries for each participant terminal (e.g., laptop computer and LAN adapter card) would require changing batteries and would interrupt the flow of a meeting and waste considerable time. Also, LAN cards would still require external low voltage power as they have no batteries. Wireless LANs need to be connected to a transmitter and are prohibitively expensive. Cellular technology is only recently available and would also be expensive.

SUMMARY OF THE INVENTION

The present invention significantly reduces setup and pack-up time for computer supported meetings, and eliminates many opportunities for failure by reducing the number of transformers and cables. It has several distinct elements: transformers, multiple access units, and custom power cables. Some data cables and a cooling fan may be stored within the system.

Shipping the inventive central power and data distribution system (CPDDS) as a self contained network eliminates the need for several other shipping containers. Providing base transformers and specialized low voltage power cabling eliminates most of the clutter associated with line power cords and multiple extension cords and individual transformers. Custom length data cables eliminate the need for combining several smaller cables or coiling large cables reducing clutter, setup, and break down time. Utilizing data cables instead of a "wireless" LAN greatly reduces cost and reliability problems.

A first embodiment of the invention relates to use within a decision support center requiring low voltage power for laptop computers and external LAN adapters. The CPDDS provides low voltage power and data connections as well as a shipping container. Portable decision centers are comprised of numerous components. They also require LAN and multiple access unit components. The system eliminates the need for individual transformers, multiple power outlets, extension cords and unsightly cabling. It substantially reduces set up and take down time. The housing acts as a shipping case providing storage areas for the power supply cables and other items. Multi access units are mounted within the enclosure. Front and rear doors are removable to allow access to the multi access units and power units. The power supplies and cables are stored within the system. Each power supply is capable of powering six laptop computers and six LAN adapters.

Power and data cables run directly from the system to the computer terminals eliminating the need for loose multi access units, individual power transformers, and multi outlet extension cords. The housing can be used as a projector table for use with a viewing screen in addition to a shipping case.

Laptop computers are typically thought to run as individual work stations, LANs are thought to be permanent fixtures in a structure. The concept of a portable decision support center operating as a LAN is a new concept. The present system is designed to supply data and power capabilities required by a DSC in various locations.

Other features and advantages of this invention will become apparent from the following detailed description of the presently preferred embodiment of the invention, taken in conjunction with the accompanying drawings.

BEST MODE FOR CARRYING OUT THE INVENTION

Figure 1A:
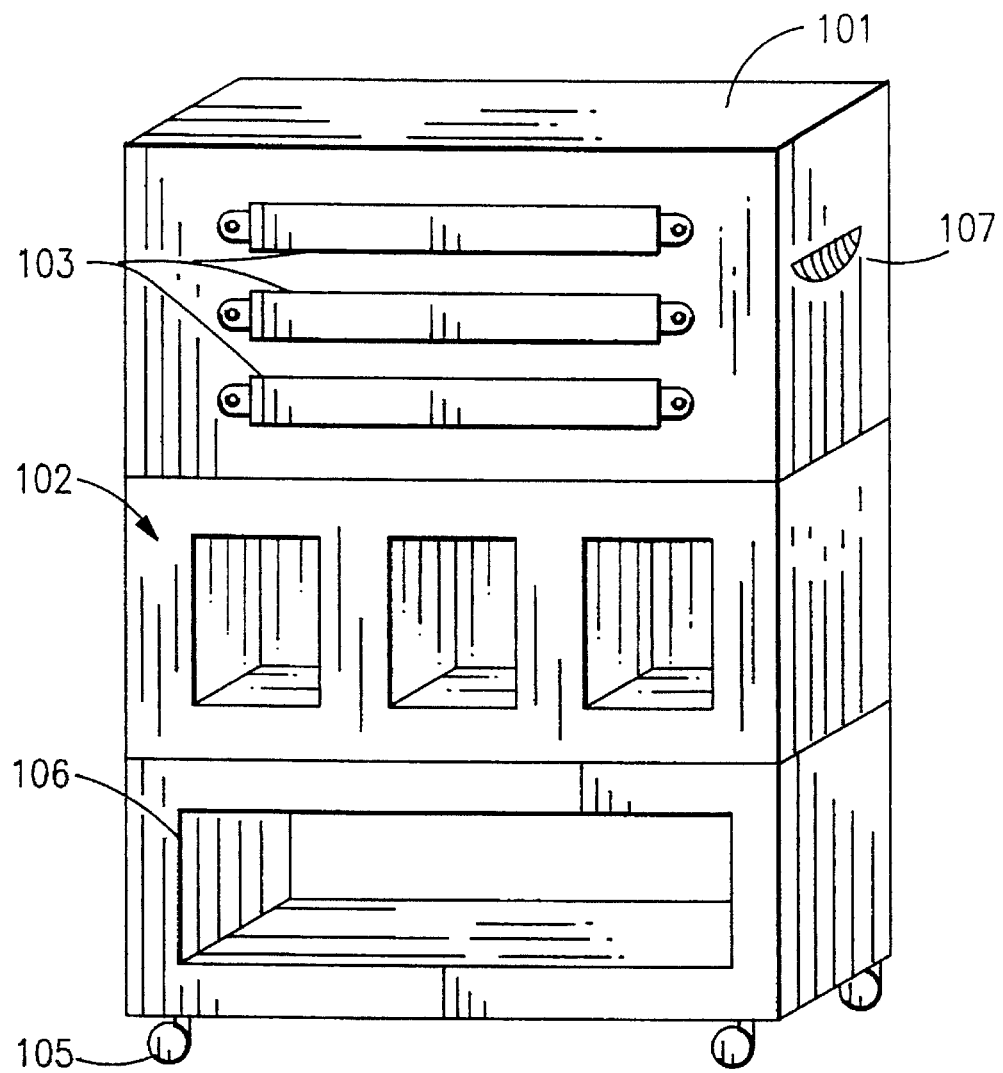
FIG. 1A illustrates a three dimensional view of the CPDDS without a cover.
Figure 1B:
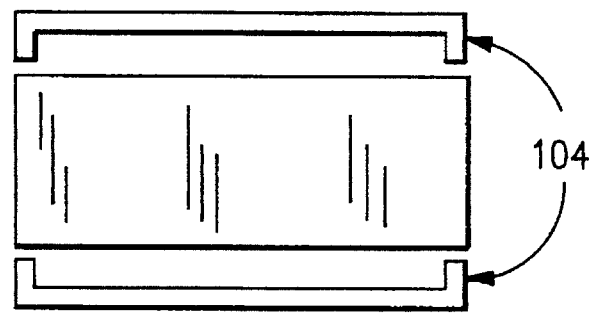
FIG. 1B illustrates a top view of the CPDDS of FIG. 1.

Referring to FIG. 1A, a CPDDS shipping and storage case 101 serves many purposes. Some of the unique elements of the case are its rugged construction, removable foam insert 102 for the transformer compartment, rack mounted MAUs 103 in another compartment, removable front and rear panels, attached with clasps or hinged, for ventilation 104 (FIG. 1B), total height allowing it to act as a projection table or printer stand, rollers 105 for easy movement, handles 107 for carrying the case, and lined accessory compartment 106.

The foam insert 102 houses three transformers during shipping. To become operational, the foam insert is removed, the transformers are stacked in the open area previously occupied by the insert. A cooling fan may be directed toward the back of the transformers increasing cooling and air circulation through the system.

Figure 2:
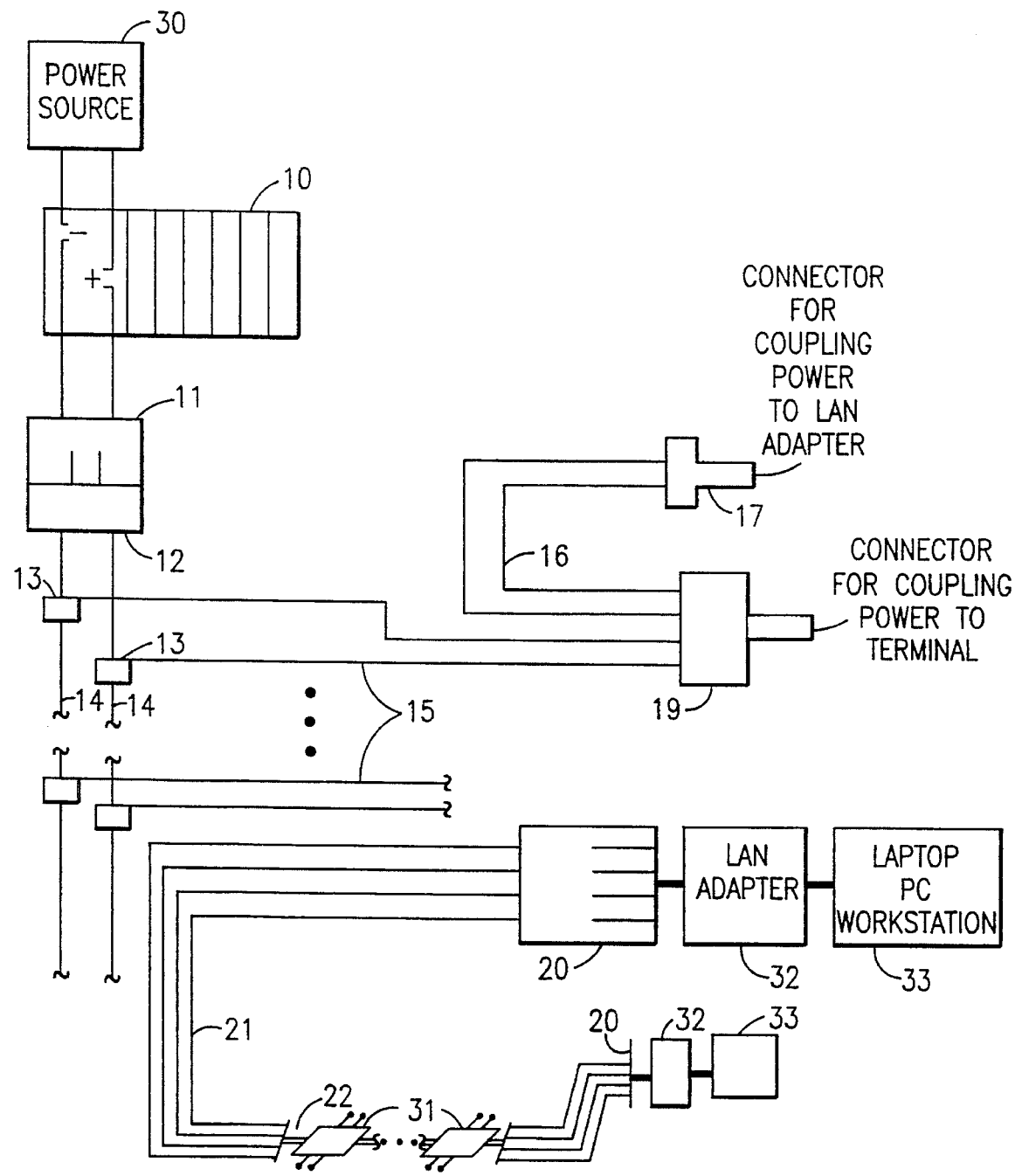
FIG. 2 is a schematic diagram of the electrical components of the invention.

Referring to FIG. 2, low voltage power is supplied to the laptops, PCs, or workstations 33 by a transformer 10 coupled to a power source 30 and custom low voltage wiring 14, 15, 16. Each laptop, PC, or workstation includes an addressable LAN adapter 32. Coaxial power plugs 17, 19 of the appropriate size are attached to appropriately gauged lead wires 16 for the LAN adapters and appropriately gauged lead wires 15 for the personal computers. An appropriately gauged main wire 14 is attached to a transformer via a socket 11 and plug 12 connection and supplies power to the leads 15, 16 via connectors 13. Each main wire/transformer accommodates six laptops.

FIG. 2 also shows a shielded - double twisted pair cable 21 with a telephone plug 20 LAN adapter connection. Our best mode implementation uses a standard data cable and connectors built to custom lengths, instead of telephone plugs. Data cables are available in standard lengths, the larger sizes being 20, 30, or 50 foot lengths. To accommodate various portable DSC configurations several shorter 8 foot cables would need to be linked together or use longer cables and coil the excess. Longer coiled cables are unsightly and heavy, multiple short cables are error prone. Custom cables of 10, 15 and 25 foot lengths eliminate the need for excessively long cable and multiple short cables. Each cable is hooked on one end 22 to a MAU 31 and on the other end 20 to a LAN adapter 32. MAUs 31 are permanently fixed to the CPDDS and link the LAN adapters for data communication between them, and may be linked together for token ring network communication, for example. Custom length data cables reduce setup time, shipping weight, clutter, and aid in error determination.

Using the CPDDS all components associated with power supply for the workstations are contained in one system having transformers and low voltage cables. As an example, for a 15 workstation network, without the CPDDS, 30 transformers and multiple extension cords and multiple power outlets would be required. They would have to be unpacked and assembled. With the CPDDS such a system requires only three transformers 10 plugged in to line current 30. Data cables 21 are run between the three mounted, and interconnected, MAUs 31 in the CPDDS and to each LAN connector. Without the custom length cables several shorter cables would need to hooked together to achieve the correct length. Custom power cables are attached to the transformers and then to each workstation 33, six workstations to each transformer. It takes approximately one hour for a single experienced facilitator to setup a 15 workstation portable DSC. It may take up to three times as long to do the same setup if each power component is separately packed and data cables need to be joined together. The same time savings are gained in break down time.

ALTERNATIVE EMBODIMENTS

A first complementary embodiment of this invention utilizes off-the-shelf electric components. For example, a transformer, such as a Tripplite PR15; a Multi-Access Unit of the International Business Machines Corporation (IBM); 3M connectors; AT&T telephone plugs; and XIRCOM LAN cards are commonly available. Such components are well known articles of commerce and are not described further.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A portable central power and data distribution system (CPDDS) comprising:

a rigid, portable enclosure surrounding an internal storage space, the enclosure including a movable surface for allowing manual access to the internal storage space and also serving as a shipping container;

power distribution means including:

at least one transformer having primary and secondary terminals;

power supply lines for coupling the primary terminals to a power source; and power distribution lines for coupling the secondary terminals to a plurality of computer terminals and a plurality of LAN adapters;

data distribution means including:

at least one multiple access unit (MAU) for linking a plurality of the LAN adapters, the LAN adapters each coupled to one MAU and to one of the computer terminals via data cables;

the data distribution means and the power distribution means stored in the internal storage space; and the data distribution means and the power distribution means being removably positioned within said rigid, portable enclosure during shipping and thereafter removable from the internal storage space and adapted for being repositioned within said internal storage space for assembly and operation of said CPDDS, for providing power and network connections to the plurality of computer terminals and to the plurality of LAN adapters, and for communicating data among the plurality of computer terminals, the computer terminals for use by a plurality of computer terminal operators.

2. The CPDDS according to claim 1 wherein the internal storage space is between about three cubic feet and about eighteen cubic feet.

3. The CPDDS according to claim 2 further comprising a plurality of wheels mounted to the enclosure for rollably transporting the CPDDS.

4. The CPDDS according to claim 3 wherein the computer terminals each comprise a laptop personal computer.

5. The CPDDS according to claim 4 further comprising:

a plurality of partitions within the enclosure forming a plurality of compartments; and a pliable insert within at least one of the compartments having openings for placement of said at least one transformer therein and for flexibly supporting said at least one transformer during shipment of the CPDDS.

6. The CPDDS according to claim 5 wherein at least one of the compartments includes means for mounting said at least one MAU.

7. The CPDDS according to claim 6, wherein said at least one MAU includes means for coupling to at least one other MAU, thereby linking the LAN adapters coupled to said at least one MAU with LAN adapters coupled to said at least one other MAU.

8. The CPDDS according to claim 7 further comprising handle means for carrying the CPDDS.

* * * * *